United States Patent [19]

Sullivan

[11] Patent Number: 4,838,556
[45] Date of Patent: Jun. 13, 1989

[54] GOLF BALL CORE BY ADDITION OF DISPERSING AGENTS

[75] Inventor: Michael J. Sullivan, Chicopee, Mass.

[73] Assignee: Spalding & Evenflo Companies, Inc., Tampa, Fla.

[21] Appl. No.: 137,649

[22] Filed: Dec. 24, 1987

[51] Int. Cl.⁴ .................. A63B 37/02; A63B 37/06
[52] U.S. Cl. .................... 273/220; 273/230; 273/235 R; 524/432; 524/908; 525/274
[58] Field of Search ............. 273/220, 230, 218; 524/908, 430; 260/998.14; 525/274

[56] References Cited

U.S. PATENT DOCUMENTS

| | | | |
|---|---|---|---|
| 4,305,851 | 12/1981 | Tominaga et al. | 425/195 |
| 4,546,980 | 10/1985 | Gendreau et al. | 524/908 |
| 4,561,657 | 12/1985 | Tominaga et al. | 524/908 |
| 4,683,257 | 7/1987 | Kakiuchi et al. | 524/908 |
| 4,726,590 | 2/1988 | Molitor | 273/230 |

*Primary Examiner*—Allan M. Lieberman
*Attorney, Agent, or Firm*—Donald R. Bahr

[57] ABSTRACT

Golf balls exhibiting superior durability and improved coefficient of restitution is provided by the inclusion of a dispersing agent in the core formulation.

15 Claims, No Drawings

GOLF BALL CORE BY ADDITION OF DISPERSING AGENTS

This invention relates to golf balls. More particularly, this invention relates to multi-ply solid golf balls having a high impact resilience and an excellent durability.

Wound golf balls which have been widely employed have been particularly desirable in possessing high impact resilience and high initial velocity on impact. However, the wound golf balls suffer a major flaw in lacking durability.

In order to improve the durability, there have been developed two-piece solid golf balls consisting of a solid core having a good impact resilience and a cover, either unitary or multi-ply, having an excellent resistance to cutting.

There are several advantages of homogenous, unitary construction for a golf ball, in contrast to the wound golf balls of the earlier art. Unitary golf balls can be produced with an essentially perfect center of gravity with attendant desirable properties of superior roll and trueness of flight. Such golf balls are highly resistant to cutting, often indestructible in normal play, and return to round even when severely distorted, maintaining their superior flight characteristics even after extended use.

Additionally, and in contrast to the wound golf balls, unitary balls maintain the integrity of their playing characteristics throughout widely varying temperature ranges, will not water log and possess an excellent shelf life.

While golf balls have found wide acceptance and constitute by far the bulk of sales, the advantages gained in the properties enumerated have been offset to a degree by decreased impact resilience.

It is, therefore, an object of the present invention to provide unitary golf balls exhibiting superior durability, and an improved coefficient of restitution.

In accordance with the present invention, there is provided a unitary golf ball comprising a solid core and a cover therefor, the solid core comprising an elastomer or admixture of elastomers, at least one metallic salt of an unsaturated carboxylic acid, free radical initiator and a dispersing agent.

It has been found that the addition of the dispersing agent to the core composition and the presence thereof during the cure cycle results in an increase of the coefficient of restitution of from about 0.5 to about 2.0 percent over that exhibited by a similar core prepared in the absence of a dispersing agent.

The core compositions of the prevent invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferable employed, or a blend of cis-polybutadiene with other elastomers may also be utilized. Most preferably, cis-polybutadiene having a weight-average molecular weight of from about 100,000 to about 500,000 is employed.

The unsaturated carboxylic acid component of the core composition is the reaction product of the selected carboxylic acid or acids and an oxide or carbonate of a metal such as zinc, magnesium, barium, calcium, lithium, sodium, potassium, cadmium, lead, tin and the like. Preferably, the oxides of polyvalent metals such as zinc, magnesium and cadmium are used, and most preferably the oxide is zinc oxide.

Exemplary of the unsaturated carboxylic acids which find utility in the present core compositions are acrylic acid, methacrylic acid, itaconic acid, crotonic acid, sorbic acid and the like, and mixtures thereof. Preferably, the acid component is either acrylic or methacrylic acid. Usually, from about 20 to about 50, and preferably from about 25 to about 40 parts by weight of the carboxylic acid salt is included in the core composition.

The free radical initiator included in the core composition is any known polymerization initiator which decomposes during the cure cycle. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 parts by weight per each 100 parts of rubber.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof.

The dispersing agent of the present core composition may be anionic, cationic, noionic or amphoteric in properties as a surfactant. If desired, mixtures of selected dispersing agents may be used. Suitable dispersing agents include alkali metal salts of fatty acids having from about 12 to about 20 carbon atoms, such as caprylic, lauric and stearic acid and the like; sulfated fats such as sulfated oleic acid, sulfated castor oil, sulfated coconut oil and the like; sodium salts of alkylated aromatic sulfonic acids such as naphthalene sulfonic acid, substituted benzoid alkyl sulfonic acids and the like; monoaryl and monoalkyl ethers of dialkylene glycols such as monomethyl and monophenyl ether of diethylene glycol and polyethylene glycol. Additionally, such dispersing agents as ammonium salts of alkyl phosphates, sodium salts of carboxylated electrolytes, sodium alkyl sulfates, monosodium salt of sulfated methyl oleate and the like may be used. Preferably, the dispersing agent is a sodium salt of polymerized alkyl naphthalene sulfonic acid or sodium salt of polymerized substituted benzoid alkyl sulfonic acids such as DARVAN (R. T. Vanderbilt Co.).

The dispersing agent is included in an amount of from about 0.1 to about 5.0, preferably from about 0.2 to about 2.0 parts by weight per 100 parts of rubber.

The core compositions of the present invention may additionally contain any other suitable and compatible modifying ingredients including, but not limited to, fillers, metal oxides, fatty acids, and diisocyanates.

As fillers, any known and conventional filler material, or mixtures thereof, may be used. Such fillers as are incorporated into the core compositions should be in finely divided form, as for example, in a size generally less than about 20 mesh and preferably less than about 100 mesh U.S. standard size. Suitable fillers include silica, silicates, zinc oxide, carbon black, cork, titania, cotton flock, cellulose flock, leather fiber, plastic and/or leather flour, asbestos, glass fibers, metal carbonates and talc. Particularly useful is the oxide or carbonate of the cation used in forming the metal salt of the unsaturated carboxylic acid component.

The amount of filler included in the core composition is primarily dictated by weight restrictions and preferably is included in amounts of from about 10 to about 100 parts by weight per 100 parts rubber.

Fatty acids may also be included in the compositions, functioning to improve moldability and processing. Generally, free fatty acids having from 10 to about 40 carbon atoms, and preferably having from about 15 to about 20 carbon atoms, are used. Exemplary of suitable fatty acids are stearic acid and linoleic acids, as well as mixtures thereof. When included in the core compositions, the fatty acid component is present in amounts of from about 1 to about 15, preferably in amounts of from about 2 to about 5 parts by weight based on 100 parts rubber.

It is preferred that the core compositions include stearic acid as the fatty acid adjunct in an amount of from about 2 to about 5 parts by weight per 100 parts of rubber.

Diisocyanates may also be optionally included in the core compositions when utilized, the diisocyanates are included in amounts of from about 0.2 to about 5.0 parts by weight based on 100 parts rubber. Exemplary of suitable diisocyanates is 4,4'-diphenylmethane diisocyanate and other polyfunctional isocyanates known to the art.

In producing golf ball cores utilizing the present compositions, the selected components are intimately mixed using, for example, two roll mills or a Banbury mixer until the mixture is uniform, usually over a period of from about 5 to about 20 minutes. The sequence of addition of components is not critical.

A preferred blending sequence is one wherein rubber, zinc salt, metal oxide, filler, fatty acid and surfactant are blended for about 7 minutes in an internal mixer such as a Banbury mixer. As a result of shear during mixing the temperature rises to about 200° F. The initiator is then added and the mixing continued until the temperature reaches about 220° F. whereupon the batch is discharged onto a two roll mill, mixed for about one minute and sheeted out.

The sheet is then placed in a Barwell preformer and slugs are produced. The slugs are then subjected to compression molding at about 325° F. for about 14 minutes. After molding and cooling, the cooling effected at room temperature for about 4 hours, the molded cores are subjected to a centerless grinding operation whereby a thin layer of the molded core is removed to produce a round core having a diameter of 1.545 inches.

Usually the curable component of the composition will be cured by heating the composition at elevated temperatures on the order of from about 275° F. to about 350° F., preferably from about 295° F. to about 325° F., with molding of the composition effected simultaneously with the curing thereof. The composition can be formed into the core structure by any one of a variety of molding techniques, e.g., injection, compression or transfer molding. When the composition is cured by heating, the time required for curing will normally be of short duration, generally from about 10 to about 20 minutes, depending upon the amounts and activity of the selected curing agent. Those of ordinary skill in the art of free radical curing agents for polymers are conversant with adjustments of cure times and temperatures required to effect optimum results from any specific free radical agent.

The core is then converted into a golf ball by providing at least one layer of covering material, ranging in thickness from about 0.050 to about 0.250 inch, preferably from about 0.060 to about 0.090 inch.

The cover composition is preferably made from ethylene-acrylic acid or ethylene-methacrylic acid copolymers neutralized with mono- or divalent metals such as sodium, potassium, lithium, calcium, zinc or magnesium.

While the cover composition may be any of a number of covering materials known in the art, such as balata, polyolefins and the like, it is preferred, for imparting durability to the ball, to employ ionomeric resins, such as those produced by neutralizing the copolymers described in U.S. Pat. No. 3,421,766 and British Pat. No. 963,380 using the procedures set out in Canadian Pat. Nos. 674,595 and 713,631. In accordance with the procedures set forth in the aforementioned patents, the ionomeric resin is produced by copolymerizing a selected olefin and unsaturated carboxylic acid to provide a copolymer having the acid units randomly distributed along the polymer chain, with the relative amounts of reactants adjusted to provide a copolymer containing from about 9 to about 15 mole percent of the carboxylic acid moiety, at least about 18 percent, preferably from about 18 to about 60 percent of the acid groups are then neutralized by metal ions having a valence of from 1 to 4, including sodium potassium, zinc, calcium, magnesium, and the like.

Suitable olefins include ethylene, propylene, butene-1, hexene-1 and the like. Unsaturated carboxylic acids which may be copolymerized with the selected olefin include acrylic acid, methacrylic acid, ethacrylic acid, alpha-chloroacrylic acid, crotonic acid, maleic acid, fumaric acid, itaconic acid and the like. Preferably, the ionomeric resin is a copolymer of ethylene with either acrylic or methacrylic acid having from about 9 to about 15 mole percent acid moiety.

The golf ball can be produced by covering the core using one of several available methods. For example, a core may be placed in the center of a golf ball mold and the cover composition injected into and retained in the surrounding space for a period of time at a mold temperature of from about 40° F. to about 120° F.

Alternatively, the cover composition may be injection molded at temperatures of from about 200° F. to about 450° F. into smooth-surfaced hemispherical shells, a core enveloped with two such shells placed in a dimpled golf ball mold at temperatures on the order of from about 100° F. to about 200° F.

Coloration of the golf ball may be effected by including a selected coloring agent uniformly dispersed in the cover composition, or by applying one or more coatings of paint to the ball after molding. Indicia is applied to complete the product.

The invention is further described in the following examples wherein the parts are by weight unless otherwise specified.

EXAMPLES

Employing the ingredients tabled below, golf ball cores having a finished diameter of 1.545 inches were produced by compression molding and subsequent removal of a surface layer by grinding. Each core was formulated using 100 parts high cis content polybutadiene. In the examples, the amounts of the remaining ingredients are expressed in parts by weight, and the degrees of coefficient of restitution and compression achieved set forth.

| Ingredients | EXAMPLES | | | | |
|---|---|---|---|---|---|
| | 1 | 2 | 3 | 4 | 5 |
| Zinc Diacrylate | 40 | 40 | 40 | 40 | 40 |
| Zinc Oxide | 17 | 17 | 17 | 17 | 17 |
| Stearic Acid | 5.0 | 5.0 | 5.0 | 5.0 | 5.0 |
| 4,4'-diphenyl methane diisocyanate | 1.0 | 1.0 | 1.0 | 1.0 | 1.0 |
| peroxide | 1.2 | 1.2 | 1.2 | 1.2 | 1.2 |
| Dodecanethiol | 1.0 | 1.0 | 1.0 | 1.0 | 1.0 |
| Dispersing Agent 1 | — | 1.0 | 5.0 | — | — |
| Dispersing Agent 2 | — | — | — | 1.0 | 5.0 |
| Weight gms. | 37.5 | 37.6 | 38.0 | 37.7 | 37.2 |
| Compression | 55 | 50 | 48 | 47 | 50 |
| Coefficient of Restitution | .805 | .814 | .803 | .816 | .797 |

(Dispersing Agent 1 - sodium salt of polymerized naphthalene sulfonic acid.
Dispersing Agent 2 - sodium salt of polymerized substituted benzoid alkyl sulfonic acid.)

| Ingredients | EXAMPLES | | | |
|---|---|---|---|---|
| | 6 | 7 | 8 | 9 |
| Zinc Diacrylate | 31 | 31 | 31 | 31 |
| Ground Flash | 18 | 18 | 18 | 18 |
| Zinc Oxide | 17 | 17 | 17 | 17 |
| Zinc Stearate | 20 | 20 | 20 | 20 |
| n-Butyl 4,4-Bis-(Butylperoxide) Valerate | 0.75 | 0.75 | 0.75 | 0.75 |
| Dispersing Agent 1 | — | 0.1 | 0.2 | 1.0 |
| Dispersing Agent 2 | — | — | — | — |
| Weight gms. | 39.9 | 39.8 | 39.8 | 40.0 |
| Compression | 62 | 63 | 60 | 63 |
| Coefficient of Restitution | .805 | .805 | .808 | .804 |
| Size | 1.545 | 1.545 | 1.545 | 1.545 |

| Ingredients | EXAMPLES | | |
|---|---|---|---|
| | 10 | 11 | 12 |
| Zinc Diacrylate | 31 | 31 | 31 |
| Ground Flash | 18 | 18 | 18 |
| Zinc Oxide | 17 | 17 | 17 |
| Zinc Stearate | 20 | 20 | 20 |
| n-Butyl 4,4-Bis-(Butylperoxide) Valerate | 0.75 | 0.75 | 0.75 |
| Dispersing Agent 1 | — | — | — |
| Dispersing Agent 2 | 0.1 | 0.2 | 1.0 |
| Weight gms. | 40.0 | 39.9 | 39.9 |
| Compression | 60 | 62 | 64 |
| Coefficient of Restitution | .806 | .808 | .804 |
| Size | 1.545 | 1.545 | 1.545 |

DISCUSSION OF THE EXAMPLES

The data for examples 1 and 6 represent controls in that the cores produced in these examples do not incorporate dispersing agents. The average coefficient of restitution for these control cores is 0.805 with an average compression of 58.5. This difference in compression is thought to be due to the fact that the formulation for example 1 is different than that of example 6.

Example 7 uses a dispersing agent at 0.1 parts, it can be seen that at this low level the use of a dispersing agent in accordance with this invention is ineffective.

Examples 3 and 5 use a dispersing agent at 5.0 parts, a relative high concentration which is ineffective, note the significant decrease in the respective coefficient of restitutions.

· Examples 2, 4, 7, 8, 10 and 11 are compositions which use dispersing agents in accordance with this invention. As we mentioned above, the average coefficient of restitution for the control data of examples 1 and 6 is .805. The average coefficient of restitution for the examples in accordance with this invention is 809.5 for an increase in the coefficient of restitution of 4.5 points. This increase of 4.5 points is significant in that it represents an increase of approximately 3 to 6 yards in the distance which a golf ball will travel when struck under controlled conditions. This beneficial increase in coefficient of restitution is achieved while maintaining a relatively constant compression.

From the above data, it can be seen that the optimum effective level of dispersing agent used in accordance with this invention varies from formulation to formulation. One skilled in the art arrives at the optimum effective level of the dispersing agent for a given formulation by experimentation. In this regard, see the data for examples 9 and 12 wherein it can be seen that the use of dispersing agent 2 in the given formulation peaks at 1.0 parts.

It is to be appreciated that the specification and examples are set forth by way of illustration and not limitation, and that various modifications and changes may be made without departing from the spirit and scope of the present invention.

What is claimed is:

1. A golf ball comprising a cover and a molded spherical core;
    said core comprising a base elastomer selected from polybutadiene having a molecular weight of from about 50,000 to about 500,000 and admixtures of said polybutadiene with other elastomers,
    at least one metallic salt of an alpha, beta-ethylenically unsaturated monocarboxylic acid,
    a free radical initiator; and
    a surfactant dispersing agent, in an amount from about 0.1 to about 5.0 parts by weight per 100 parts of rubber, selected from sulfated fats, sodium salts of aklylated aromatic sulfonic acids, substituted benzoid alkyl sulfonic acids, monoaryl and alkyl ethers of diethylene glycol and dipropylene glycol, ammonium salts of alkyl phosphates, sodium alkyl sulfates and monosodium salt of sulfated methyl oleate and sodium salts of carboxylated eletrolytes.

2. The golf ball as defined by claim 1 wherein said elastomer is cis-polybutadiene.

3. The golf ball as defined by claim 1 wherein said cover comprises an ionic copolymer of ethylene and an alpha, beta-ethylenically unsaturated monocarboxylic acid selected from the group consisting of acrylic acid and methacrylic acid wherein about 20–90 percent of the carboxylic acid groups are neutralized by a metal ion.

4. The golf ball as defined by claim 1 wherein said monocarboxylic acid is selected from the group consisting of acrylic acid, methacrylic acid, itaconic acid, crotonic acid, sorbic acid and mixtures thereof.

5. The golf ball as defined by claim 1 wherein crosslinking of said elastomer and said metallic salt is effected by a free radical initiator.

6. The golf ball as defined by claim 5 wherein said free radical initiator is selected from the group consisting of peroxides, persulfates, hydrazides and azo compounds.

7. The golf ball as defined by claim 1 wherein said core further comprising a modifying ingredient selected from fillers, metal oxides, low molecular weight fatty acids, diisocyanates and mixtures thereof.

8. The golf ball as defined by claim 7 wherein said modifying ingredient is a low molecular weight fatty acid.

9. The golf ball as defined by claim 8 wherein said fatty acid is stearic acid.

10. The golf ball as defined by claim 7 wherein said modifying ingredient is diisocyanate.

11. The golf ball as defined by claim 10 wherein said diisocyanate is 4,4'-diphenyl methane diisocyanate.

12. The golf ball as defined by claim 7 wherein said modifying ingredient is metal oxide.

13. The golf ball as defined by claim 12 wherein said metal oxide is zinc oxide.

14. The golf ball as defined by claim 1, wherein said dispersing agent is a sodium salt of polymerized alkyl naphthalene sulfonic acid.

15. The golf ball as defined by claim 1, wherein said dispersing agent is a sodium salt of polymerized substituted benzoid alkyl sulfonic acid.

* * * * *